United States Patent [19]

Engelhart

[11] Patent Number: 4,613,169
[45] Date of Patent: Sep. 23, 1986

[54] SPA FITTING SEALING SYSTEM
[75] Inventor: Jack Engelhart, Clio, Mich.
[73] Assignee: Quality Pool Supply Co., Clio, Mich.
[21] Appl. No.: 648,297
[22] Filed: Sep. 7, 1984
[51] Int. Cl.⁴ ............................................. F16L 3/04
[52] U.S. Cl. .................................... 285/161; 285/211;
285/343; 285/208; 285/189; 261/DIG. 75;
277/191; 4/541; 4/507; 4/195
[58] Field of Search ............... 285/161, 162, 200, 211,
285/189, 212, 196, 339, 343, 342, 345, 205–209,
221, 113; 4/192, 195, 507, 541, 542, 543, 544,
492, 198; 277/71, 79, 191; 128/65, 66;
261/DIG. 75; 16/2; 239/222.21, 428.5, 432,
383

[56] References Cited

U.S. PATENT DOCUMENTS

| | | | |
|---|---|---|---|
| 548,706 | 10/1895 | Gundermann | 285/212 |
| 556,755 | 3/1896 | Kelly | 285/196 |
| 780,797 | 1/1905 | Hoeregott | 285/206 |
| 958,910 | 5/1910 | Drake | 285/19 |
| 1,211,061 | 1/1917 | Bock | 285/215 |
| 1,278,011 | 9/1918 | Pullinger | 285/206 |
| 1,745,954 | 2/1930 | Raybould | 285/208 |
| 1,815,046 | 7/1931 | Burr et al. | 285/192 |
| 2,348,490 | 5/1944 | Newman et al. | 285/212 |
| 2,476,074 | 7/1949 | Unger | 285/212 |
| 2,926,935 | 3/1960 | La Marre | 285/184 |
| 3,181,899 | 5/1965 | McKnight Jr. | 285/208 |
| 3,240,515 | 3/1966 | Schmohl | 285/212 |
| 3,401,958 | 9/1968 | Demyon | 285/161 |
| 3,946,449 | 3/1976 | Mathis | 261/DIG. 75 |
| 4,240,166 | 12/1980 | Altman et al. | 4/542 |
| 4,264,039 | 4/1981 | Moreland | 261/DIG. 75 |
| 4,320,541 | 3/1982 | Neenan | 261/DIG. 75 |
| 4,358,862 | 11/1982 | Altman et al. | 128/66 |
| 4,411,458 | 10/1983 | Strunk | 285/196 |
| 4,420,846 | 12/1983 | Bonner | 4/542 |
| 4,460,519 | 7/1984 | Leggett | 128/66 |
| 4,508,665 | 4/1985 | Spinnett | 261/DIG. 75 |

FOREIGN PATENT DOCUMENTS

| | | | |
|---|---|---|---|
| 561357 | 1/1959 | Italy | 285/211 |
| 954337 | 4/1964 | United Kingdom | 285/212 |

Primary Examiner—Cornelius J. Husar
Assistant Examiner—Eric K. Nicholson
Attorney, Agent, or Firm—Gifford, Groh, VanOphem, Sheridan, Sprinkle & Dolgorukov

[57] ABSTRACT

A system for sealing a pool or spa fitting includes a wall having a frustoconical hole therethrough, the hole expanding towards the outer side of the wall. A conduit or inlet fitting is disposed in the hole and has an integrally formed enlarged end portion which abuts the inner surface of the wall. The fitting also has an externally threaded portion opposite the enlarged end, and a nut is threadably disposed on the fitting. A resilient, rubber seal such as a V-gasket or O-ring is disposed interjacent the fitting, the nut, and the surface of the hole. This construction ensures a positive seal of the spa or pool fluid system, while being of substantially simpler and less expensive construction than prior sealing systems.

15 Claims, 4 Drawing Figures

SPA FITTING SEALING SYSTEM

BACKGROUND OF THE INVENTION

I. Field of the Invention

The present invention is directed to fluid systems, and more particularly to a pool or spa fitting sealing system.

II. Description of the Prior Art

It has long been known to employ a permanently installed inlet or outlet with a pool or spa. It is, of course, necessary to employ some sort of system to seal the inlet or outlet fitting to avoid leakage of water therearound. Several sealing systems are known, and function adequately for their intended purposes. However, their use has entailed some drawbacks. Fittings and systems made substantially of metal have a tendency to damage plastic or rubber pool liners, or fiberglass pool walls. Surface scoring increases the likelihood of a fracture at the scored location. Conventional fitting sealing systems are generally complex in nature, needing several fitting pieces to ensure a positive seal. Other drawbacks are known as well.

SUMMARY OF THE PRESENT INVENTION

The present invention overcomes these and other drawbacks by providing a pool or spa fitting sealing system which is inexpensive and simple in construction, yet which ensures a positive seal for preventing leaking. The sealing system first comprises a fiberglass pool or spa wall having an inner surface, and an outer surface including a wall portion defining a frustoconical hole through the wall. The hole opens to the outside of the pool or spa, at about a 120 degree angle to the outer surface of the wall. A preferably plastic conduit fitting, such as an inlet fitting, is disposed in the hole. The fitting has an integrally formed enlarged end portion abutting the inner surface of the wall. The enlarged end portion can include an annular flat surface which abuts the inner wall surface. The fitting also has an externally threaded portion opposite the enlarged end portion. A nut is threadably disposed on the threaded portion of the fitting. Lastly, the system comprises a resilient rubber seal such as a V gasket or an O-ring disposed between and abutting the surface of the hole, the fitting, and an abutment surface on the nut.

The invention thus provides a spa or pool fitting sealing system which is both inexpensive and simple in construction, yet which ensures a positive seal about the fitting, without damaging the pool wall.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
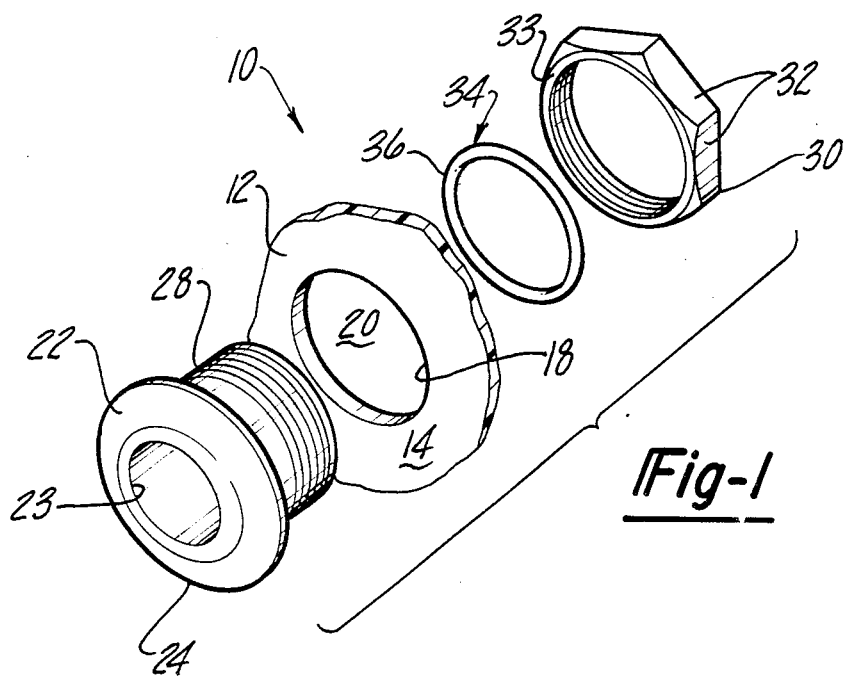
FIG. 1 is an exploded view of the preferred embodiment of the present invention.
Figure 2:
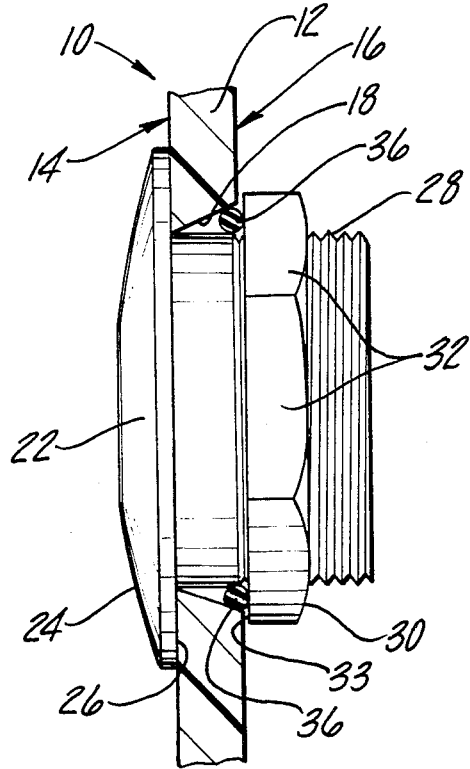
FIG. 2 is a partial cross-sectional view of the preferred embodiment of the present invention.

With reference now to FIGS. 1 and 2, a spa fitting sealing system 10 according to the present invention is thereshown and first comprises a fiberglass spa wall 12 having an inner surface 14 and an outer surface 16. The outer wall surface 16 includes a wall portion 18 formed thereon. The wall portion 18 defines a frustonconical hole 20 extending through the wall 12. The wall portion 18 is disposed at an angle 30 degrees from the perpendicular to the wall surfaces, or an angle of about 120 degrees from the outer wall surface 16. The frustoconical hole 20 thus opens toward the outside of the pool or spa.

A conduit fitting 22, such as an inlet fitting or a conduit end, is disposed in the frustoconical hole 20. The fitting 22 includes an enlarged end portion 24 having an annular flat surface 26 formed thereon, for abutment against the inner wall surface 14. The conduit fitting 22 also comprises an externally threaded portion 28 disposed opposite the enlarged end portion 24 extending outwardly beyond the outer wall surface 16. A throughbore 23 in the fitting 22 allows fluid communication of the interior and exterior of the spa.

Figure 3:
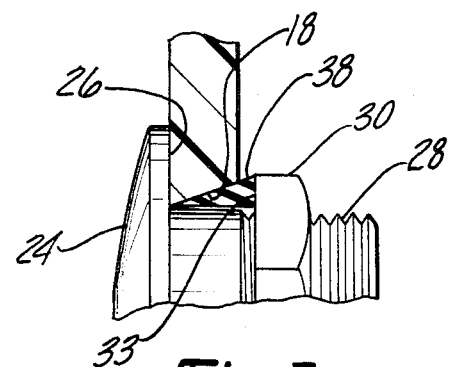
FIG. 3 is a partial cross-sectional view similar to FIG. 2 showing another preferred embodiment of the present invention.

A nut 30 having a plurality of wrench surfaces 32 is threadably disposed on the externally threaded portion 28 of the fitting 22. The nut 30 includes an abutment surface 33 for abutment with a seal member 34 disposed interjacent the wall portion 18, the fitting 22 and the abutment surface 33 of the nut 30. As is shown in FIG. 2, in a first preferred embodiment of the present invention, the seal member 34 comprises a rubber O-ring 36. In a second preferred embodiment of the present invention, as shown in FIG. 3, the seal member 34 comprises a rubber or plastic V-gasket 38.

Use of the fitting sealing system according to the present invention is straightforward. The frustoconical hole 20 is formed or drilled in the fiberglass pool wall 12, with the hole 20 expanding towards the exterior of the pool. The fitting 22 is disposed in the hole 20 with the annular flat surface 26 substantially abutting the inner wall surface 14. The seal 34 is placed over the threaded portion 28 of the fitting 22, and is slid to or near abutment with the hole defining wall portion 18 and the fitting 22. The nut 30 is then disposed on the threaded portion 28, and tightened until it is brought into sealing abutment with the seal member 34. The nut 30 is tightened, for example, by the engagement of a wrench with the wrench surfaces 32, until a fluid seal about the fitting 22 is obtained. The pool or spa is then filled with water and used in its conventional and presumably enjoyable fashion.

Figure 4:
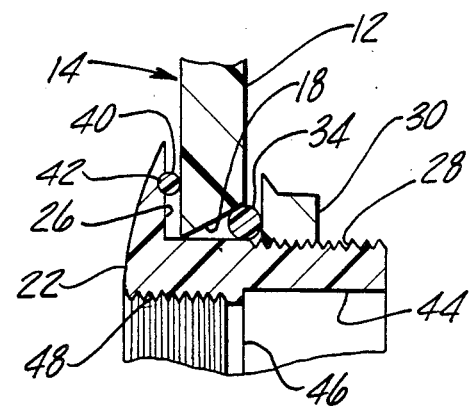
FIG. 4 is a cross-sectional view of another preferred embodiment of the present invention.

With particular respect now to FIG. 4, another preferred embodiment of the present invention is thereshown, wherein a second seal member 40 is disposed in an annular groove 42 on the face 26 of the fitting 22. The second seal member 40 sealingly abuts both the annular flat surface 26 of the fitting 22 and the inner wall surface 14 when the nut 30 is tightened. In this embodiment, the fitting 22 preferably comprises an axial throughbore 44 having an annular stop 46 disposed therein. One side 48 of the bore 44, towards the interior of the spa, bears threads formed therein. A fitting having a throughbore is particularly useful for the union of conduits or the like on opposite sides of the wall 12.

Because the fitting 22 preferably comprises a plastic fitting, the invention is particularly useful with pools which employ a rubberized or plasticized lining. Unlike a metal fitting, the plastic fitting will not tear or damage the pool liner. A particular advantage of the present fitting is that it does not depend upon the integrity of the pool liner for maintaining a fluid seal about the fitting 22.

Having described my invention, however, many modifications thereto will become apparent to those skilled in the art to which it pertains, without deviation from the spirit of the present invention, as defined by the scope of the appended claims.

I claim:

1. In combination, a pool wall construction comprising:
    a pool wall composed of a plastic material and having inner and outer surfaces; said pool wall outer surface including a portion defining a continuous and uniformly tapered frustoconical hole through said wall to said inner wall surface, said portion being angled about 60 degrees with respect to said inner wall surface;
    a pool inlet fitting constructed of a material compatible with said pool wall which dimensioned closely to the diameter of said hole, which passes through said hole, and which comprises a unitarily formed enlarged end having an annular flat surface disposable closely adjacent to said inner pool wall surface, and an externally threaded portion opposite said enlarged end;
    a threaded nut disposed on said threaded portion of said pool inlet fitting, having an annular flat surface thereon facing said outer pool wall; and
    a resilient seal member disposed between and abutting against each of said inlet fitting, said hole-defining portion of said pool wall outer surface, and said annular flat surface on said nut, so as to provide a waterproof seal between said fitting and said pool wall.

2. The invention according to claim 1, wherein said combination additionally comprises an arcuate annular recess on said annular flat surface of said enlarged end portion of said inlet fitting, and a resilient O-ring disposed in said recess and abuttable against said pool wall inner surface so as to provide a supplemental waterproof seal between said fitting and said pool wall.

3. The invention according to claim 1, wherein said seal member comprises a rubber O-ring.

4. The invention according to claim 1, wherein said seal member comprises a rubber V-gasket.

5. The invention according to claim 1, wherein said nut includes a plurality of wrench-engageable surfaces thereon.

6. The invention according to claim 1, wherein said inlet fitting is composed of a plastic material.

7. The invention according to claim 1, wherein said annular flat surface of said enlarged end of said inlet fitting abuts against said pool wall inner surface.

8. In combination, a pool wall construction consisting essentially of:
    a pool wall composed of a plastic material and having inner and outer surfaces; said pool wall outer surface including a portion defining a continuous and uniformly tapered frustoconical hole through said wall to said inner wall surface, said portion being angled about 60 degrees with respect to said inner wall surface;
    a pool inlet fitting constructed of a material compatible with said pool wall which is dimensioned closely to the diameter of said hole, which passes through said hole, and which comprises a unitarily formed enlarged end having an annular flat surface disposed against said inner pool wall surface, and an externally threaded portion opposite said enlarged end;
    a threaded nut disposed on said threaded portion of said pool inlet fitting, having an annular flat surface thereon facing said outer pool wall; and
    a resilient seal member disposed between and abutting against each of said inlet fitting, said hole-defining portion of said pool wall outer surface, and said annular flat surface on said nut, so as to provide a waterproof seal between said fitting and said pool wall.

9. The invention according to claim 8, wherein said seal member consists of a rubber O-ring.

10. The invention according to claim 8, wherein said seal member consists of a rubber V-gasket.

11. The invention according to claim 8, wherein said nut includes a plurality of wrench-engageable surfaces thereon.

12. The invention according to claim 8, wherein said inlet fitting is composed of a plastic material.

13. In combination, a pool wall construction consisting essentially of:
    a pool wall composed of a plastic material and having inner and outer surfaces; said pool wall outer surface including a portion defining a continuous and uniformly tapered frustoconical hole through said wall to said inner wall surface, said portion being angled about 60 degrees with respect to said inner wall surface;
    a pool inlet fitting constructed of a material compatible with said pool wall which is dimensioned closely to the diameter of said hole, which passes through said hole, and which comprises a unitarily formed enlarged end having an annular flat surface disposable closely adjacent to said inner pool wall surface; an externally threaded portion opposite said enlarged end; an arcuate annular recess of said annular flat surface of said enlarged end portion of said inlet fitting; and a first resilient O-ring disposed in said recess and abuttable against said pool wall inner surface so as to provide a waterproof seal between said fitting and said pool wall;
    a threaded nut disposed on said threaded portion of said pool inlet fitting, having an annular flat surface thereon facing said outer pool wall; and
    a second resilient O-ring disposed between and abutting against each of said inlet fitting, said hole-defining portion of said pool wall outer surface, and said annular flat surface on said nut, so as to provide a supplemental waterproof seal between said fitting and said pool wall.

14. The invention according to claim 13, wherein sid nut includes a plurality of wrench-engageable surfaces thereon.

15. The invention according to claim 13, wherein said inlet fitting is composed of a plastic material.

* * * * *

UNITED STATES PATENT AND TRADEMARK OFFICE
CERTIFICATE OF CORRECTION

PATENT NO. : 4,613,169
DATED : September 23, 1986
INVENTOR(S) : Jack Engelhart

It is certified that error appears in the above-identified patent and that said Letters Patent are hereby corrected as shown below:

Column 2, line 67, before "a" insert --such--.

Column 3, claim 1, line 25, after "which" insert --is--.

Signed and Sealed this

Third Day of February, 1987

Attest:

DONALD J. QUIGG

*Attesting Officer*   *Commissioner of Patents and Trademarks*